US005662207A

United States Patent [19]
Lehmann

[11] Patent Number: 5,662,207
[45] Date of Patent: Sep. 2, 1997

[54] PROCEDURE FOR LOADING A TRANSPORT STAR AND TRANSPORT ARRANGEMENT AS WELL AS USES THEREOF

[76] Inventor: Martin Lehmann, Obere Farnbühlstr. 1, 5610 Wohlen, Switzerland

[21] Appl. No.: 375,661

[22] Filed: Jan. 20, 1995

[30] Foreign Application Priority Data

Jan. 21, 1994 [CH] Switzerland ............... 192/94

[51] Int. Cl.$^6$ ............... B65G 47/12; B65G 47/26; B65G 47/68
[52] U.S. Cl. ............... 198/447; 198/427
[58] Field of Search ............... 198/433, 447, 198/479.1, 480.1, 481.1, 427

[56] References Cited

U.S. PATENT DOCUMENTS

| | | |
|---|---|---|
| 3,357,537 | 12/1967 | Ring ............... 198/427 |
| 4,697,691 | 10/1987 | Zodrow et al. ............... 198/433 |
| 5,160,558 | 11/1992 | Gardener . |
| 5,191,964 | 3/1993 | Spisak . |

FOREIGN PATENT DOCUMENTS

| | | |
|---|---|---|
| 0191158 | 8/1986 | European Pat. Off. . |
| 1587777 | 3/1970 | France . |
| 2295894 | 7/1976 | France . |
| 8815216 | 3/1989 | Germany . |

*Primary Examiner*—Joseph E. Valenza
*Attorney, Agent, or Firm*—Antonelli, Terry, Stout & Kraus, LLP.

[57] ABSTRACT

In order to increase the throughput rate of conveyors with a conveyor star, it is proposed that groups consisting of several bulk items be fed essentially radially to said star (13) and that in the process the mutual positions of bulk items (1) be adapted to the curved mutual positions of transport recesses (23) on conveyor star (13) and/or to the intervals between them.

6 Claims, 2 Drawing Sheets

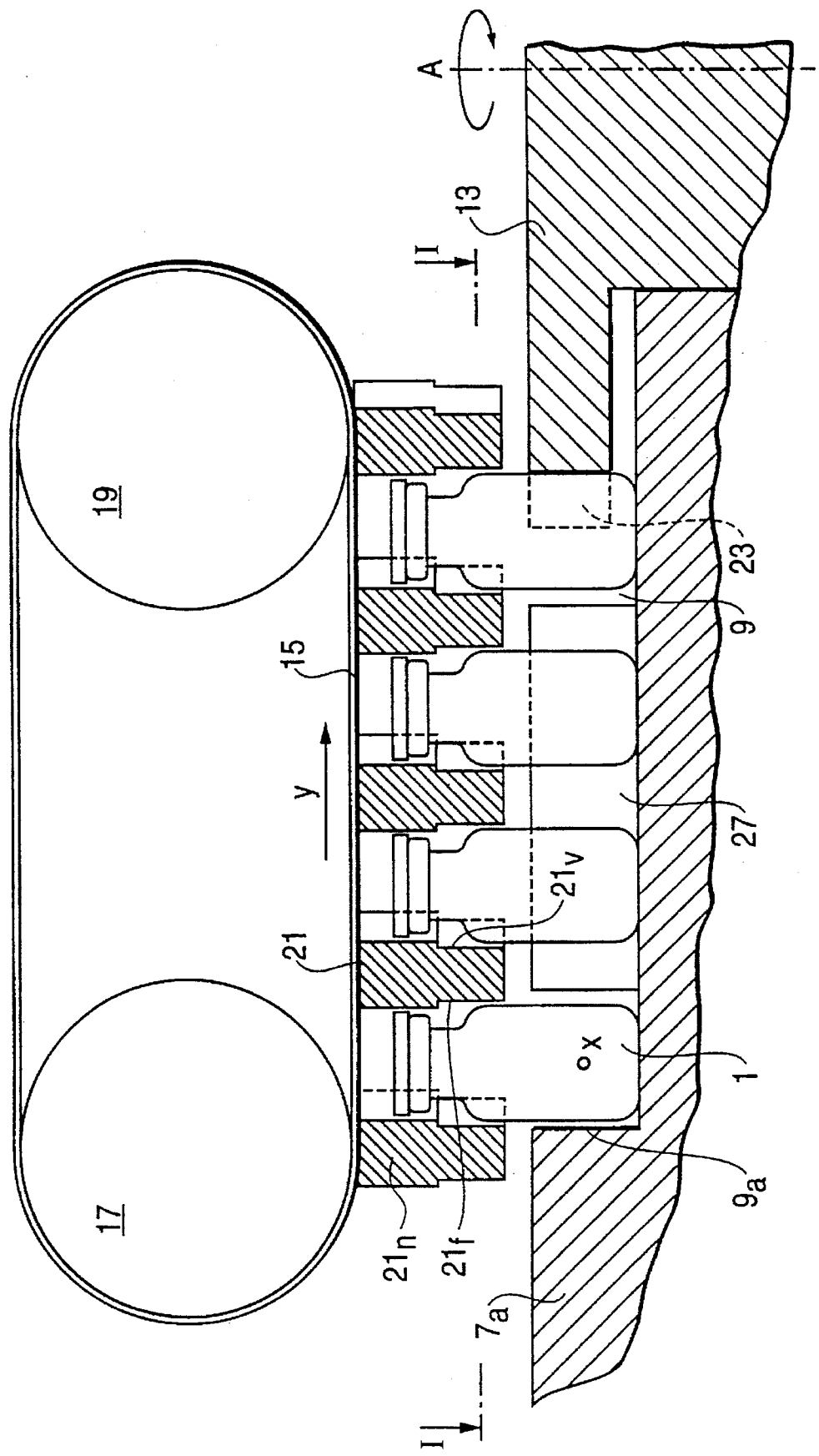

PROCEDURE FOR LOADING A TRANSPORT STAR AND TRANSPORT ARRANGEMENT AS WELL AS USES THEREOF

FIELD OF THE INVENTION

This invention pertains to a procedure, a transport arrangement, and preferred uses of said procedure and said arrangement, for loading a transport star with bulk items, particularly rotationally symmetrical containers, especially filled jars or vials or empty jar bodies or vial bodies, in which the bulk items are fed in a stream to the periphery of the star with conveyor recesses and in which in a transfer area bulk items are directed into transport recesses of the star.

BACKGROUND AND SUMMARY OF THE INVENTION

FR-A-2 295 894, corresponding to U.S. Pat. No. 4,012,893, calls for transporting several containers simultaneously between destinations that are arranged at angles to one another with the aid of a centrally arranged, controlled-swiveling, and telescoping tappet. In this process the tappet acts as an actual distribution station.

A transfer mechanism that operates in a similar manner between angled stringers of endless belt conveyors is known from DE-U-88 15 126.

EP-A-0 191 158, corresponding to U.S. Pat. No. 4,697,691, indicates a device for the group-wise and row-wise transfer of upright containers that are conveyed in rows. In this case transfer elements are designed as segments of a circle that are eccentrically arranged on a rotating support, whereby said segments rotate or oscillate around the corresponding circle-segment axis. The transfer elements work together with transfer and receiving stations according to the roll-off method, whereby the above-mentioned rolling off causes one container after another to be received by the segments or to be transferred therefrom.

U.S. Pat. No. 5,191,964 also calls for picking up cardboard containers, which pile up in line, in pairs, still in line, and transferring pairs of recesses, also arranged in a straight line, in a rotary transporter or receiving them back from said transporter. The cardboard containers in each pair remain oriented in a line with respect to one another.

U.S. Pat. No. 5,160,558 calls for conveying a stack of plate-type transported objects tangentially in the direction of stacking toward a smooth wheel, directing the stack between the periphery of the wheel and an outer guide that is concentric with said wheel and, while keeping the stack securely attached to the wheel fore and aft with the aid of carriers, moving it along the guide on a circular track until it reaches a removal tappet arrangement that forms an extension of the guide which is curved in the shape of a circular track.

FR-A-1 567 777 also calls for moving a group of bulk items that simultaneously accumulate in a line transversely to the direction of accumulation with the aid of a tappet device.

Procedures for transporting bulk items, such as containers in particular, filled or empty, within the framework of their production or filling with the aid of transport stars are known. In this case the bulk items are transferred from supply conveyors, such as conveyor belts to a transport star, which turns continuously or is clock-controlled to turn at intermittent intervals. During the former star motions, the transfer is frequently accomplished with the aid of screw conveyors.

This invention basically pertains to the transfer technique using star-wheel conveyors, and it matters little whether said conveyors operate at intermittent intervals or continuously.

During the transfer from the front-end conveyor to the conveyor star or vice versa, as EP-A-0 191 158 indicates in an improved version, it is common practice to load and unload one transport recess in the star after the other.

In this process, as mentioned above, such transport techniques are used in the manufacturing, testing, and checking of bulk items as well as being used on containers to fill said items. In the case of complete systems used for this purpose, the throughput rate is determined by the slowest element in the processing and transport sequence.

With this in mind, this invention has set itself the goal of creating a procedure and a transport arrangement of the type mentioned above by means of which the transport rate that can be achieved per unit of time is increased. This is accomplished by the procedure of the invention and the arrangement of the invention wherein before the bulk items are directed into transport recessed, the mutual positions of at least two bulk items are established in accordance with the curvature of the mutual positions of successive conveyor recesses on the star, and wherein the bulk items, with intervals between bulk items that correspond to the intervals of successive transport recesses on the star, are simultaneously transferred to at least two conveyor recesses on the star.

Because the mutual positioning of the bulk items is determined in accordance with the curvature of the mutual positions of two and preferably three or more transport recesses that follow one right after the other on the star and the bulk items are simultaneously transferred in this mutual arrangement to the corresponding number of transport recesses in the star, this produces a substantial increase in the bulk-item throughput rate which is determined by the loading procedure alone.

In this process it is basically irrelevant whether transport takes place at intermittent intervals, i.e., in cycles, or continuously. Even in the latter case the procedure of the invention can be used if at least two bulk items are fed into the transport recesses of the transport star at the right instant.

In addition, in transports of the type under discussion here, the bulk items are conveyed, temporarily resting against one another, toward the conveyor star. Usually, however, transport stars have an angular gap between transport recesses. Taking this into account, it is proposed that, before reaching the transport recesses, the gaps between bulk items be adjusted to match the gaps between the transport recesses. It is preferable for both alternatives to be offered.

Although the establishment of the curved mutual positions of the bulk items on their transport track can be done long before reaching the transfer area by, for example, gradually converting a straight conveyor belt into a correspondingly curved one, in accordance with the invention it is proposed that this transition be made only when the bulk items begin to be pushed into the transfer area, preferably by pushing them into a curved guide. With respect to the alternative mentioned above, this leads to considerably lower production costs.

A transport arrangement according to the invention for accomplishing the task mentioned in the beginning of this description comprises an intermediate conveyor having carriers, each designed for a bulk-item group comprising at least two bulk items and having transport surfaces that are curved in accordance with the mutual positions of successive transport recesses on the star.

The procedure of the invention and the transport arrangement of the invention are particularly suitable for inspection systems for bulk items, while they are particularly suitable for rotationally symmetrical containers, especially for filled or empty jars or vials as noted above. Vials are defined as glass-jar-like containers with rubber plugs and metal sealing strips, such as those used for pharmaceuticals and medications, e.g., vaccines.

The invention is explained below by referring to two figures.

BRIEF DESCRIPTION OF THE DRAWINGS

Here:

FIG. 2 shows a cross-sectional representation along line II—II of FIG. 1.

DETAILED DISCLOSURE OF PREFERRED EMBODIMENT

Figure 1:
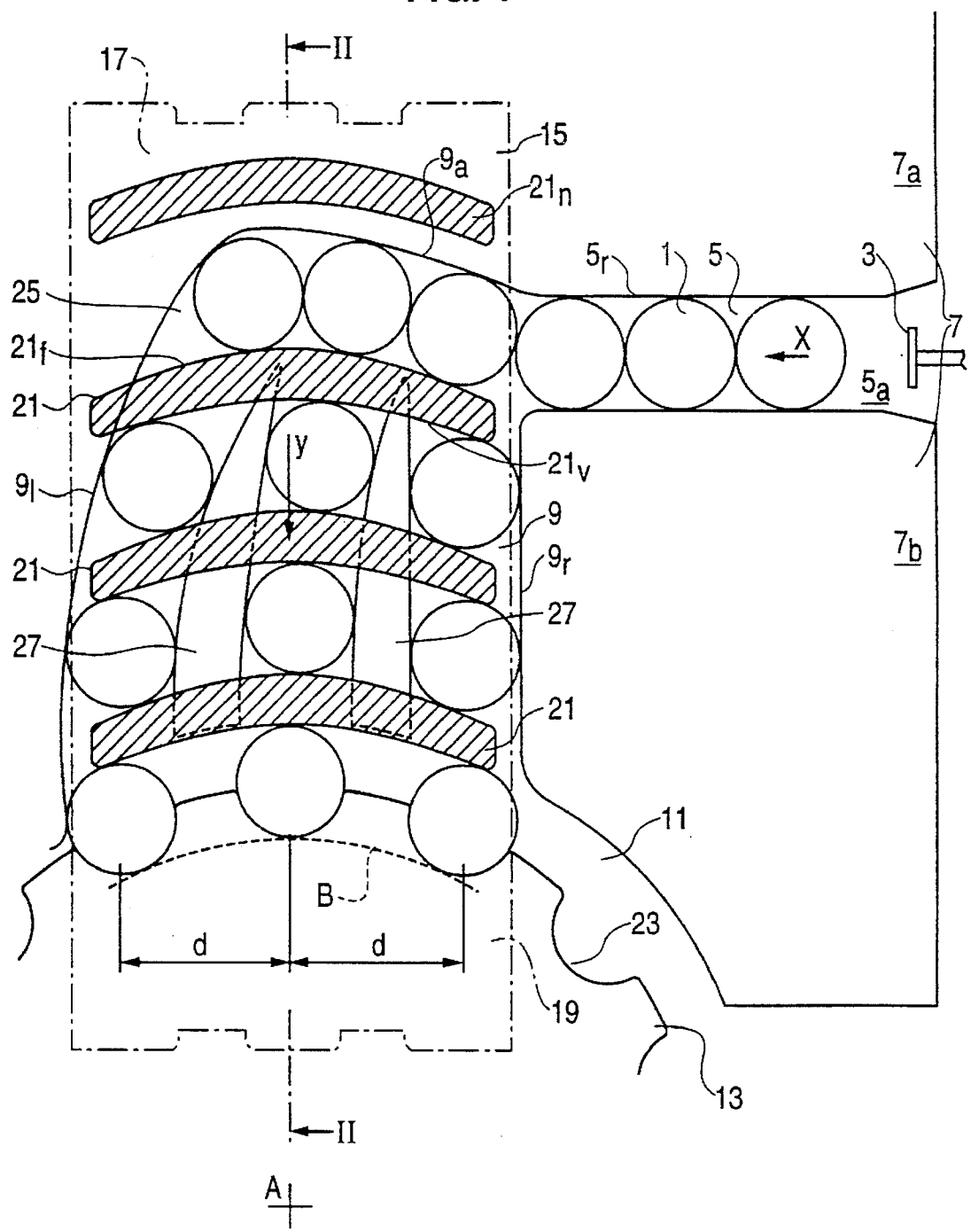
FIG. 1 shows a top view of the transfer area of a transport arrangement according to the invention that operates according to the procedure of the invention.

As indicated in FIG. 1, bulk items 1, preferably in the form of empty or filled rotationally symmetrical containers, particularly vials, are pushed by a linear guide device, shown only in schematic form, such as a pusher 3, into a guide channel 5, which is formed into a two-part guide plate 7, consisting of parts $7_a$ and $7_b$.

In guide channel 5 there is a base $5_a$ for supporting bulk items 1. Guide channel 5, with its orientation x, empties into a transfer channel 9 which is shaped to bridge between parts $7a$ and $7_b$ and which runs essentially perpendicularly to guide channel direction x. For its part transfer channel 9 empties into the area of the periphery of a conveyor star 13, whose axis of rotation A is vertical to the plane described by guide channel direction x and transfer channel direction y.

Transfer channel 9 expands as it moves toward conveyor star 13 by virtue of the fact that its one lateral edge $9_r$, represented by plate section $7_b$, runs at right angle to direction x of the guide channel, while the opposite lateral edge 9 determines the expansion in section $7_a$ in the shape of a bow.

With its lateral edge $5_r$ that faces away from conveyor star 13, guide channel 5 turns into a bow-shaped starting edge $9_a$ of transfer channel 9. As depicted in FIG. 1, above (see FIG. 2) plate section $7_a$ is a belt conveyor that encompasses a belt 15 and is driven via rollers 17 and 19. With respect to conveyor star 13, conveyor belt 15 with rollers 17 and 19 is also at the top in the depiction in FIG. 2.

As shown in FIG. 2 in particular, conveyor belt 15 has carriers 21 which, relative to conveyance direction of belt 15 corresponding to y, define a front bowed carrier surface $21_v$ and a rear bowed carrier surface $21_r$. Carrier surface $21_v$ has a curvature which is essentially the same as the curvature of a bow B which connects the bases of three successive conveyor recesses 23 on conveyor star 13. The length of bow-shaped initial edge $9_a$ of transfer channel 9 is such that three bulk items 1 from guide channel 5 can rest directly against this edge, as shown.

With linear feeding device 3, generally at least two and, in the example shown, three bulk items 1 are pushed in at the start of transfer channel 9, flush with initial edge $9_M$, in which case, as shown in FIG. 2, guide surface $21_f$ of each carrier 21 forms the conveyor star-side edge of a "dynamically" formed receiving channel 25 for the three bulk items. In the selected representation, carriers 21 are arranged above transfer channel 9 between plate sections $7_a$ and $7_b$ but, as FIG. 2 in particular shows, traverse a path whereby they come into contact with container parts that extend above said plate 7. Therefore, said receiving channel 25, which is referred to as "dynamic" due to the mobility of carriers 21, is formed with above-mentioned guide surfaces $21_f$ for receiving three bulk items 1 at a time.

Then bulk items 1 are picked up in receiving channel 25 by next carrier $21_n$ which follows in the direction of rotation y of belt 15 and is moved toward conveyor star 13. Because, on the one hand, bulk items 1 are fed forward in guide channel 5 resting against one another and are also pushed into receiving channel 25 in the same way and because, on the other hand, there are gaps on conveyor star 13 between conveyor recesses 23 corresponding to chords d and $2_d$ that are shown in FIG. 1, there are stationary expansion fingers 27 that protrude into the path of bulk items 1 on belt 15. Starting from receiving channel 25, said fingers extend between bulk items 1 that still rest against one another and enlarge the spaces between them by spreading them out against conveyor star 13, until the size that corresponds to the spaces between guide recesses 23 in conveyor star 13 is reached.

Therefore, starting from receiving channel 25 three bulk items are fed simultaneously in direction y by belt 15 to conveyor star 13, in which process the spaces between them, as required on the conveyor star side, are established and/or their relative arrangement is created in the shape of a bow, corresponding to the bow-shaped arrangement of conveyor recesses 23 on conveyor star 13. Thus, each of the three bulk items in the case depicted is smoothly guided simultaneously into each of three conveyor recesses 23 without any mechanical impairment whatsoever.

As far as the rotational motion of conveyor star 13 is concerned, the entire transfer procedure can be continuous or intermittent. In the case of intermittent operation, in each case the requisite number, in the example shown three conveyor recesses 23, are brought into alignment with transfer channel 9 and expansion fingers 27 in one cycle, then loaded, and in the next cycle three more still-empty conveyor recesses 23 are moved up. Accordingly, in cycles belt 15 picks up one group of three bulk items after the other on the receiving channel side and transfers them to the conveyor star on the conveyor star side. The conveyor cycles of belt 15 and star 13 are synchronized, of course, which can be done by known means using synchronization gears or electrically synchronized drives.

If conveyor star 13 is operated continuously, then its motion must be synchronized with that of belt 15 in such a way that whenever conveyor recesses 23 pass through the position shown in FIG. 1, a group of bulk items is transferred from belt 15, which is operated either continuously or in cycles. If conveyor 15 is also operated continuously, then it merely needs to be ensured that whenever a receiving channel 25 is dynamically defined, a group of bulk items is forced into the above-mentioned receiving channel by linear conveyor 3. In the case of continuous operation, the conveyance speeds of conveyor star 13, belt 15, and linear conveyor 3, as well as the mutual phase positions of carriers 21, conveyor recesses 23, and the group advance mechanisms must be coordinated with one another with the aid of linear conveyor 3.

I claim:

1. Transport arrangement for bulk items with a conveyor, by means of which the bulk items are conveyed in a stream essentially one after the other toward a conveyor star with transport recesses and are transferred to said star, wherein there is an intermediate conveyor that conveys essentially radially with respect to said conveyor star and whose conveyance width essentially corresponds to the chord length between at least two successive transport recesses on said star and wherein at the intermediate conveyor there are carriers, each designed for a bulk-item group comprising at least two bulk items and having transport surfaces that are curved in accordance with the mutual positions of successive transport recesses on said star.

2. Arrangement according to claim 1, further comprising separation devices along the conveyor path of the intermediate conveyor which extend into a conveyor track of a conveyed bulk-item group and which adapt the mutual intervening spaces of bulk items of each group of bulk items that are conveyed by the intermediate conveyor toward the transport star to the intervals between successive transport recesses on the star.

3. Arrangement according to claim 1, wherein the conveyor comprises a linear conveyor which empties into a curved guide track in the area where the intermediate conveyor operates.

4. Arrangement according to claim 1, wherein the carriers of said intermediate conveyor are each designed for conveying groups of bulk items consisting of at least three bulk items.

5. Arrangement according to claim 1, wherein said bulk items are conveyed by said transport arrangement in an inspection system for bulk items.

6. Arrangement according to claim 1, wherein said bulk items are rotationally symmetrical containers, especially filled jars or vials or empty jar bodies or vial bodies.

* * * * *